(No Model.)

A. B. L. LAMB.
COMPENSATING GEAR FOR TRACTION ENGINES.

No. 340,220. Patented Apr. 20, 1886.

Witnesses.
John C. Perkins
Arthur M. Ransom.

Inventor.
A. B. Lewis Lamb
By Lucius C. West
atty.

UNITED STATES PATENT OFFICE.

A. B. LEWIS LAMB, OF KALAMAZOO, MICHIGAN, ASSIGNOR OF TWO-THIRDS TO GEORGE H. SHOUDY AND JOHN M. SHOUDY, BOTH OF SAME PLACE.

COMPENSATING GEAR FOR TRACTION-ENGINES.

SPECIFICATION forming part of Letters Patent No. 340,220, dated April 20, 1886.

Application filed January 16, 1886. Serial No. 188,714. (No model.)

*To all whom it may concern:*

Be it known that I, A. B. LEWIS LAMB, a citizen of the United States, residing at Kalamazoo, county of Kalamazoo, State of Michigan, have invented a new and useful Compensating Gear for Traction-Engines, of which the following is a specification.

The object of this invention is to provide an improved compensating gear for traction-engines or other vehicles, designed to effect more satisfactory results in their use and operation.

Figure 1:
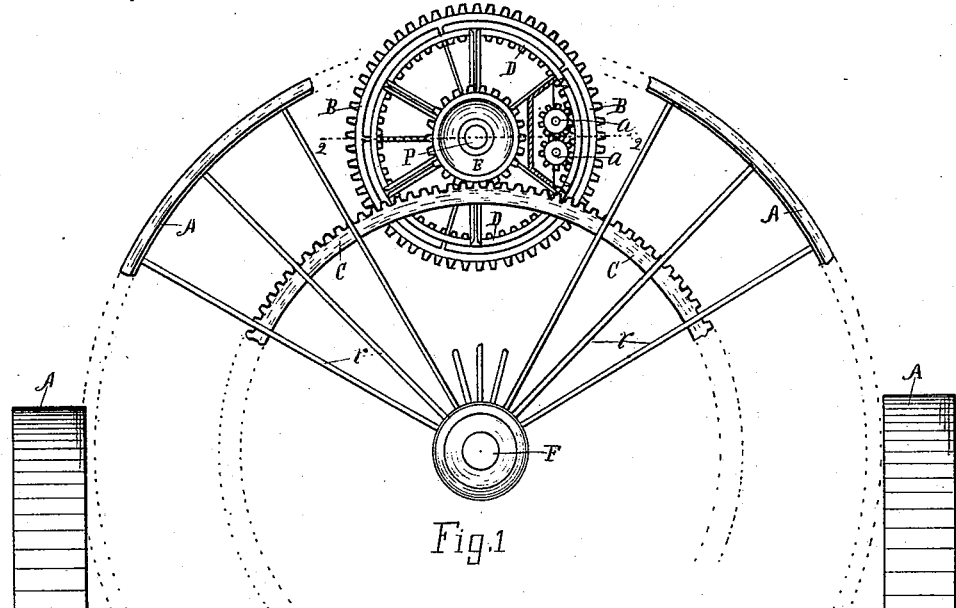
Figure 2:
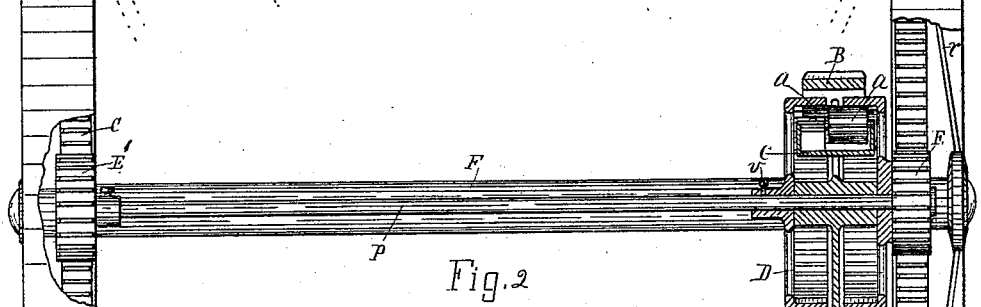
Figures 3, 4:
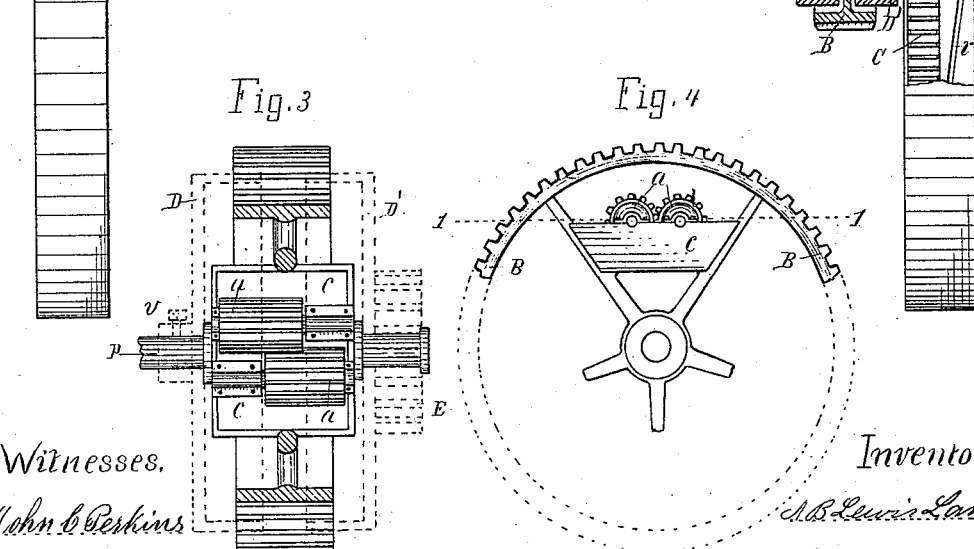

In the drawings forming a part of this specification, Figure 1 is an elevation with parts broken away and the wall of the tray *c* removed, looking from a point at the right of Fig. 2; Fig. 2, top view, with portions in section on line 2 2 in Fig. 1; Fig. 3, a top view of Fig. 4, with parts in section on line 1 1; and Fig. 4 is an elevation, enlarged, of gears in Fig. 1, referred to by like letters.

Referring to the letters marked on the drawings, A A are two traction-wheels, and F their axle, preferably the rear axle of a traction-engine. Secured on the inner side of each wheel A A are gears C C, for the engagement therewith of the propelling mechanism below described. A shaft, P, is provided with a rigidly-secured pinion, E', on one end and a loose pinion, E, on the other end, Fig. 2. These gears mesh with the gears C of the traction-wheels A.

It will be understood by users of traction-engines that the shaft P has suitable bearings on the engine. (Not here shown.)

The gear B, to which power is to be applied, is loose on the shaft P. For this gear B may be substituted a band-wheel or sprocket-wheel, for connection therewith of the propelling mechanism of the engine, which will be readily understood without illustrating the engine here. This gear-wheel B carries one or more sets of lapping-pinions, *a a*, which pinions mesh with each other where they lap, Fig. 3, as in prior compensating gears. The axle of the meshing pinions are integral with said pinions and rotate with them, instead of the pinions rotating on axial shafts, as heretofore, and said axles of the meshing pinions have bearing at each end in the side walls of the tray *c*. Thus the pinions are less liable to get out of their normal position. This tray is either formed integral with the spokes of the gear-wheel B or rigidly secured thereto, thus strengthening the spokes which carry the tray and making the gear B lighter.

An internal gear, D, is rigidly mounted on the shaft P and meshes with the end of one of the gears *a*, the left-hand one in Figs. 1 and 3—that is, the gear D is made rigid on the shaft P by means of a set-screw, *v*. Thus said gear D is adjustable on the shaft P, by which means it may be moved to the left on the shaft P, to examine and to lubricate the meshing pinions and the internal gears, and the power-gear B and the internal gear may be adjusted to the right whenever the gears become worn, so as to always keep the hubs of the internal gears, D D', and the power-gear B sufficiently close together for the most successful gear-engagement of the internal gears and the meshing pinions, and to obviate rattling of parts. The other internal gear, D', loose on the shaft P, meshes with the end of the other gear *a*. (See right-hand side of Fig. 3.)

The internal gear, D', and the pinion E are integral with each other, as heretofore.

The internal gears, D D', and pinion E are shown in dotted lines in Fig. 3.

The operation is similar to that of prior constructions. Power being applied to the driving-gear B, the pinions *a a* are carried around with said gear B. As the pinions *a a* mesh with the internal gears, D D', they would rotate in like directions but for the fact that they mesh with each other where they lap, as before explained, and hence they lock with the internal gears and rotate the latter. This action rotates both pinions E' E, and hence drives the traction-wheels A A. This is the effect when running straight ahead. In turning, (and one traction-wheel stops and the other goes ahead, or one of said wheels moves ahead and the other turns back,) one of the internal gears will stop and one of the pinions *a* will rotate around said internal gear which is at rest. To illustrate: Suppose the left-hand wheel, A, stops and the other moves ahead, in turning the engine around, then only the right-hand internal gear, D', rotates, carried by the interlocking pinions *a a*, as before explained, while the left-hand pinion, a, will rotate around the internal gear, D; but as soon as the engine goes straight ahead again, both of the internal gears will rotate and power be applied to both traction-wheels again, as before explained.

Having thus described my invention, what I claim as new, and desire to secure by Letters Patent, is—

1. In a compensating gear, substantially as set forth, the power-gear having spokes connecting its outer rim with its hub, provided with a tray rigidly connecting with two of the spokes and supported by them, lapping pinions having rigidly-connected axles, with rotable bearings at each end in the side walls of said tray, in combination with the internal gears of the shaft, which forms a meshing engagement at each end with the gears of the traction-wheels, substantially as set forth.

2. In a compensating gear, substantially as set forth, the combination of the power-gear provided with the tray, and the lapping pinions having axle-bearings at each end in the side walls of said tray, and the internal gears, one of which is loose on its shaft and the other is adjustably keyed to its shaft, whereby it may be adjusted laterally, substantially as and for the purpose set forth.

In testimony of the foregoing I have hereunto subscribed my name in presence of two witnesses.

A. B. LEWIS LAMB.

Witnesses:
 JOHN C. PERKINS,
 GEORGE H. SHOUDY.